Figure 1:
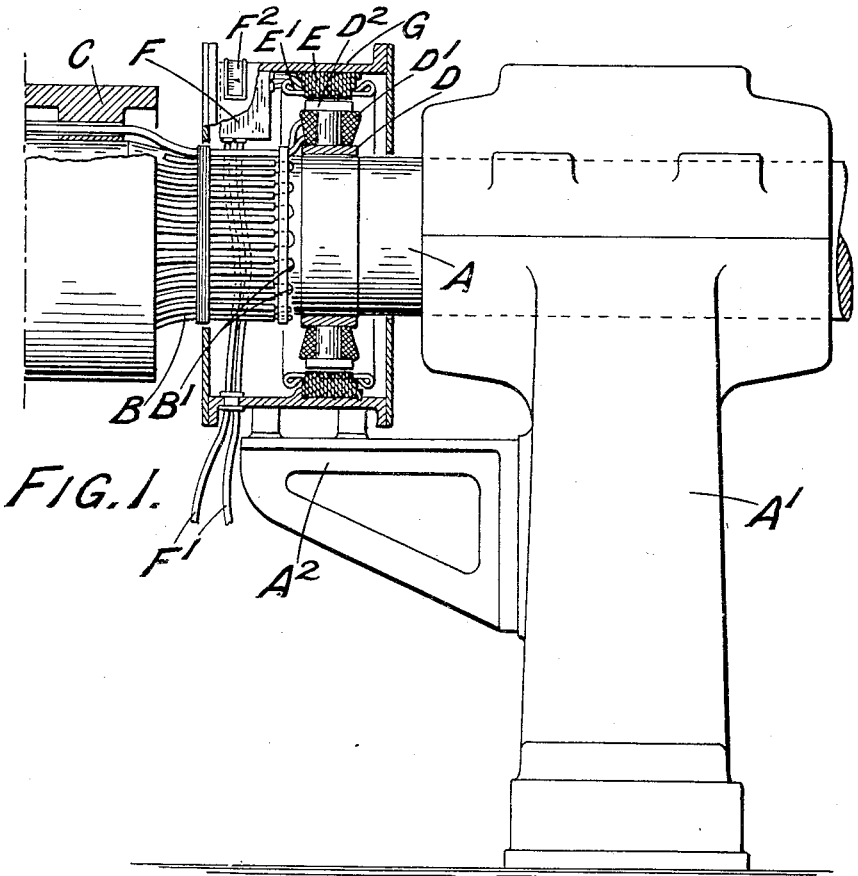

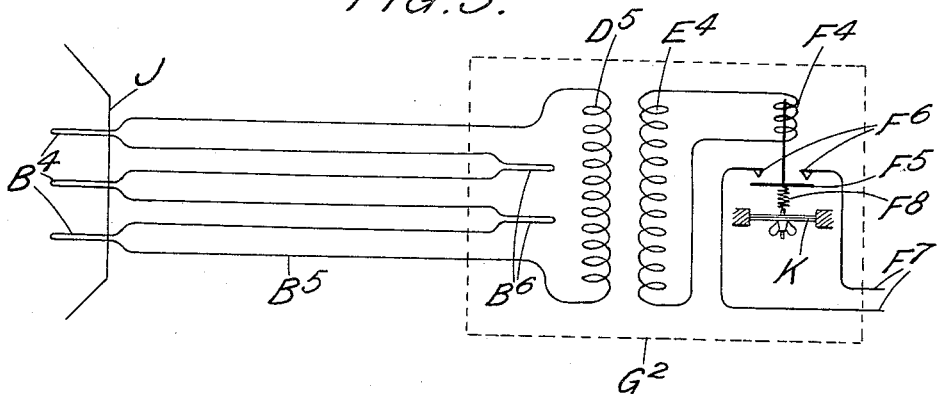

Patented Apr. 1, 1930

1,752,609

UNITED STATES PATENT OFFICE

HERBERT BRYAN POYNDER, OF NEWCASTLE-UPON-TYNE, ENGLAND, ASSIGNOR TO ELECTRICAL IMPROVEMENTS LIMITED, OF NEWCASTLE-UPON-TYNE, ENGLAND, A COMPANY OF GREAT BRITAIN

THERMOELECTRICALLY-OPERATED DEVICE FOR THE PROTECTION OF ROTARY DYNAMO-ELECTRIC MACHINES

Application filed December 12, 1928, Serial No. 325,574, and in Great Britain January 3, 1928.

This invention relates to thermo-electrically-operated devices for the protection of rotary dynamo-electric machines.

The primary object of the invention is the protection against overheating of the rotors of converters or other dynamo-electric machines in automatic substations, but its application is not restricted thereto.

The invention relates generally to the type of protective device which depends upon the voltage due to the difference of temperature between the hot and cold junctions of a series of thermo-electric couples, such voltage producing a current in a relay or some equivalent contact-controlling or indicating member. Many such devices have been employed but chiefly in connection with the stators or other stationary parts of the machines to be protected. A difficulty in applying such devices to the rotary parts has been that the cold junctions have been stationary and, owing to the low voltage and small current from the thermo-couples, it has not been possible to provide the necessary connections through slip rings.

In a protective arrangement according to the present invention the use of slip rings is not necessary for the cold junctions rotate with the rotary portion of the machine and are connected to a winding or coil also rotating with the machine, such winding being in inductive relationship with a stationary winding in circuit with a relay or the like. Thus the connections if any to exterior circuits do not involve any moving collecting devices.

The hot junctions of the thermo-couples are arranged in any convenient and known way on the rotary portion of the machine, for instance, they may be embedded in the winding of the rotor of a converter or dynamo-electric machine and leads from them pass along or through the shaft to some suitable point where the cold junctions are situated. These junctions are joined in series to the winding or coil which is conveniently a winding round an iron core forming the rotor of a small dynamo-electric machine. This rotor is mounted on the shaft and rotates with the cold junctions.

In close proximity to the poles of this small rotor, is its stator comprising a suitable iron core with a winding. This stator is mounted within a stationary casing surrounding the adjacent portion of the shaft which carries the cold junctions and preferably the casing also contains a relay to which the winding of the stator is connected. The cold junctions, the stator winding and the relay winding being thus in close proximity, will be substantially at the same temperature. The casing may, if desired, be lagged.

Variations in the temperature of the cold junctions; for example, the difference between the cold junction temperature say in summer and winter, and also consequent variations in the resistance of the winding of the stator and relay may be compensated for in any suitable way, as, for example, by an arrangement working on a principle known in itself, as applied to pyrometers for making a zero adjustment on indicating apparatus. This arrangement in the present invention may be in the form of a bi-metallic strip placed in or on the relay. To this strip the spring controlling the armature or moving part of the relay is attached directly or indirectly. The strip is so arranged that when the temperature is high, the tension in the spring is decreased so that the relay armature can move to complete the circuit which it controls under a smaller pull from its electromagnet than when the cold junction temperature is low.

The current developed by the stator will be alternating, but, if preferred, the relay may be of the continuous current type, the alternating current being rectified by known means.

The relay may control in any convenient way a tripping, alarm or indicating circuit or any combination of the three.

The armature or like moving part of the relay which is preferably controlled by a spring adjustable for setting purposes, may have a fairly long range of movement and, if desired, such movement may itself be used to give an indication of the temperature of the hot junctions, the amount of movement being indicated by some suitable pointer and scale arrangement which can be viewed through a window in the casing.

The mechanical arrangement of the cold junctions, the small rotor, the stator and the relay may vary to suit the particular machine to which the invention is applied. For instance, in the case of a converter with a solid shaft, the apparatus may be arranged between the slip rings of the converter and the adjacent bearing of the shaft, the leads from the hot junctions to the cold junctions being brought along the shaft inside the slip rings and attached to it by binding or in some other convenient way. In cases where the converter or other machine has a hollow shaft, the leads may be brought through that shaft to the cold junctions and the small rotor may be mounted on the end of the hollow shaft. In either case the small rotor should preferably be mounted on a carrier of brass or other non-magnetic material so as to reduce magnetic leakage from the shaft to a minimum. The stationary casing may be mounted on the main bearing pedestal or on the bedplate, or where wear of the main bearings is liable to occur, the casing may be hung on the shaft itself on ball or roller bearings and flexibly anchored to the main bearing pedestal or bedplate, so as to prevent its rotation.

Figure 2:
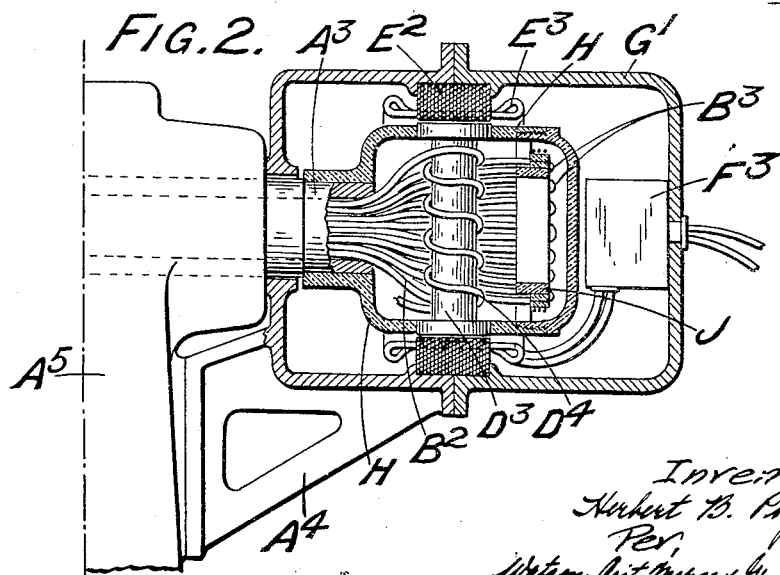

In the accompanying drawings,

Figure 1 is an elevation with parts in section of one construction of thermo-electrically-operated device according to this invention, Figure 2 is a similar view of a modified construction and Figure 3 illustrates the electrical connections.

Each of the figures is diagrammatic the non-essential details being omitted.

With reference first to Figure 1, A is the shaft of the dynamo-electric machine supported in the pedestal bearing $A^1$. Conductors B lead from thermo-electric junctions (not shown) embedded in any well known way in the winding of the rotor of the machine to cold junctions $B^1$ the conductors being bound round the shaft A and passing through a sleeve C which may carry the main slip rings of the machine.

Mounted upon the shaft A close to the cold junctions $B^1$ is an iron core D having a winding $D^1$ in series with the thermo-electric circuit. The poles $D^2$ of the core D, of which only two are shown, are in close proximity to a small stator E whose winding $E^1$ is connected to a relay F. The stator and the relay are mounted within a stationary casing G preferably of non-magnetic material, carried by a bracket $A^2$ on the pedestal $A^1$. Connections $F^1$ are shown leading from the relay F out of the casing G. These may be connected to any suitable exterior apparatus for indicating, for giving an alarm or for tripping purposes but the details of these form no part of the present invention.

The construction of the relay in itself is not shown as again those details including the bi-metallic strip compensating arrangement previously referred to are not in themselves part of the invention, but a scale and indicator are represented at $F^2$ as showing that the motion of the movable member of the relay may be observed through a window in the casing G in addition to or instead of the exterior apparatus to which the connections $F^1$ may lead.

It will be appreciated that the core D forms the rotor of a small dynamo-electric machine of which E is the stator and that the rotor and its winding, the cold junctions $B^1$, the conductors B and the hot junctions all rotate with the main rotor of the machine. The stator E and relay F are stationary and there is no need for slip rings or any similar moving connections at all.

The relay F, the cold junctions $B^1$, the rotor D and stator E are all quite close to one another in the casing G so that they will be approximately at the same temperature. The casing, as previously mentioned, may be lagged.

In the arrangement above described with reference to Figure 1 the protective device is placed between the machine and its bearing pedestal.

Figure 2 illustrates a modified construction suitable for use at the end of a machine having a hollow shaft $A^3$ through which the conductors $B^2$ leading to the cold junctions $B^3$ pass. The small rotor $D^3$ is mounted in a carrier H of brass or other non-magnetic metal which is fixed to the end of the shaft $A^3$. Its winding, shown purely diagrammatically at $D^4$, is, as in the construction previously described, connected in series with the circuit containing the cold junctions $B^3$ which are bound round a ring J forming part of a frame or spider held in the carrier H. The stator $E^2$ with its winding $E^3$ and the relay $F^3$ are mounted within a stationary casing $G^1$ shown as carried on a bracket $A^4$ attached to the pedestal bearing $A^5$.

In Figure 3, which is purely diagrammatic, J indicates part of the main rotor windings of the machine in which are embedded in any well known way the hot junctions $B^4$ of the thermocouples connected by conductors $B^5$ (corresponding to conductors B of Figure 1) to the cold junctions, of which two are shown at B⁶. D⁵ represents the small rotor winding rotating with the machine. E⁴ is the small stator winding corresponding to E¹ of Figure 1 or E³ of Figure 2. F⁴ is the relay coil operating an armature F⁵ controlling contacts F⁶ in an indicating alarm or tripping circuit F⁷. The armature F⁵ is controlled by a spring F⁸ adjustably connected to a bi-metallic strip K which, when the cold junction temperature is high, bends and decreases the tension in the spring F⁸ so that the relay armature F⁵ can move to complete the circuit which it controls under a smaller pull from the coil F⁴ than when the said temperature is low. The broken line G² indicates an enclosing casing which tends to keep all the parts within it at substantially the same temperature.

What I claim as my invention and desire to secure by Letters Patent is:—

1. In a thermo-electrically-operated device for the protection of a rotary dynamo electric machine, the combination with the rotor of the machine, of thermocouples rotating therewith, a coil also rotating therewith and in electrical connection with said thermocouples and forming an inducing winding, and a fixed coil forming a winding in inductive relationship with said rotating coil.

2. In a thermo-electrically-operated device for the protection of a rotary dynamo electric machine, the combination with the shaft and the main rotor of the machine, of thermocouples rotating with said main rotor, a small rotor mounted on said shaft, a winding for said small rotor, electrical connections between said winding and the cold junctions of said thermocouples, a stationary casing enclosing said cold junctions and said small rotor, and a stator mounted in said casing and cooperating with said small rotor.

3. In a thermo-electrically-operated device for the protection of a rotary dynamo electric machine, the combination with the shaft and the main rotor of the machine, of thermocouples rotating with said main rotor, a small rotor mounted on said shaft, a winding for said small rotor, electrical connections between said winding and the cold junctions of said thermocouples, a stationary casing enclosing said cold junctions and said small rotor, a stator mounted in said casing and cooperating with said small rotor, a relay in said casing, and electrical connections between said stator and said relay.

4. In a thermo-electrically-operated device for the protection of a rotary dynamo electric machine, the combination with the shaft and the main rotor of the machine, of thermocouples rotating with said main rotor, a small rotor mounted on said shaft, a winding for said small rotor, electrical connections between said winding and the cold junctions of said thermocouples, a stationary casing enclosing said cold junctions and said small rotor and having a window, a stator mounted in said casing cooperating with said small rotor, a relay in said casing, an indicator on said relay the movement of such indicator being visible through said window, and electrical connections between said stator and said relay.

In testimony whereof I have signed my name to this specification.

HERBERT BRYAN POYNDER.